Jan. 14, 1930.                A. G. PERKINS                1,743,477
                       SEAMING TOOL FOR PIPE JOINTS
                    Filed April 2, 1928        2 Sheets-Sheet 1
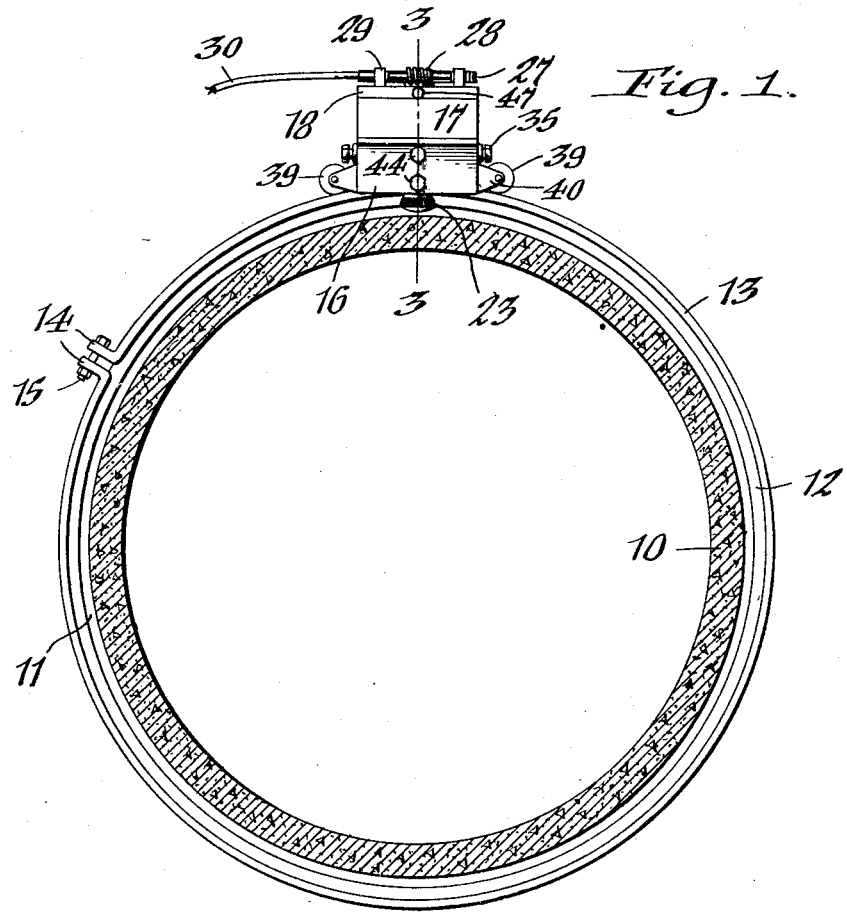
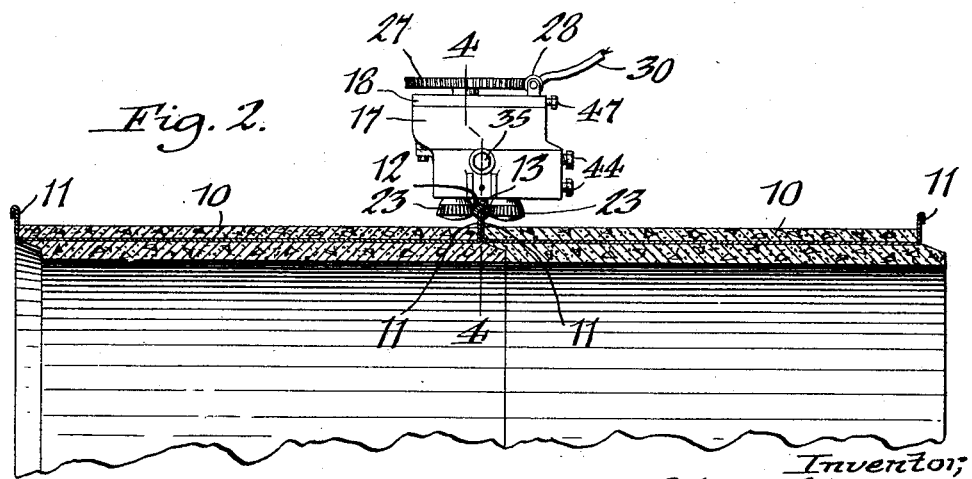
Inventor:
Albert G. Perkins,
by Guyer & Guyer
Attorneys.

Jan. 14, 1930.  A. G. PERKINS  1,743,477
SEAMING TOOL FOR PIPE JOINTS
Filed April 2, 1928   2 Sheets-Sheet 2
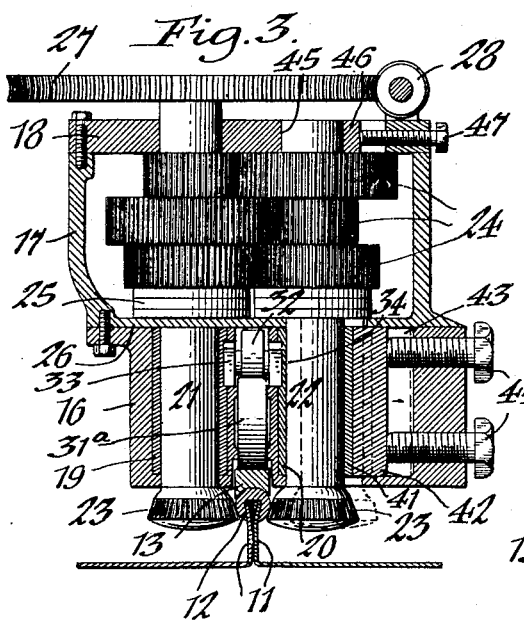
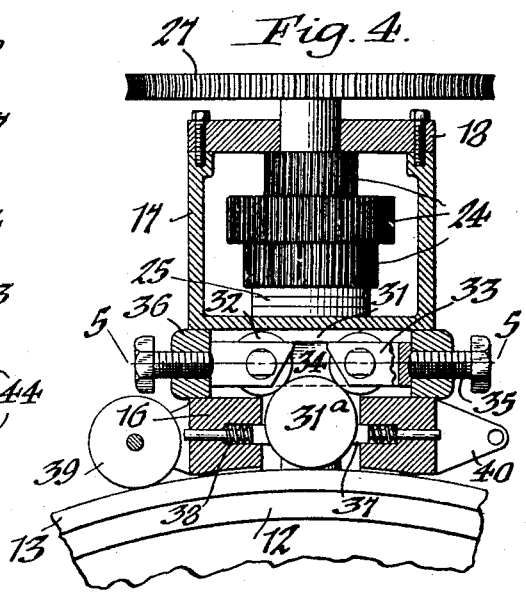
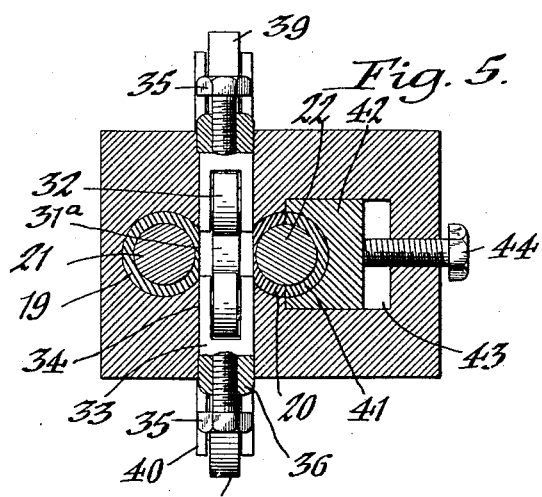
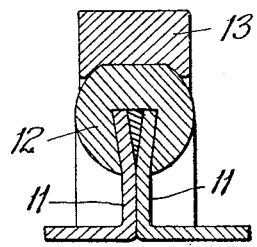
Inventor,
Albert G. Perkins,
by Guyer & Guyer
Attorneys.

Patented Jan. 14, 1930

1,743,477

UNITED STATES PATENT OFFICE

ALBERT G. PERKINS, OF BUFFALO, NEW YORK

SEAMING TOOL FOR PIPE JOINTS

Application filed April 2, 1928. Serial No. 266,817.

This invention relates generally to a seaming tool, and more particularly to a tool which has been designed for sealing the flanged joints of concrete pipes and the like.

One of its objects is to provide a simple, compact and inexpensive seaming tool of this character which will effectually and reliably seal a pipe joint in a minimum period of time.

A further object of the invention is the provision of an electrically driven seaming tool which is constructed for ready application to and from the pipe joint, and which is adjustable for use with pipes of varying diameters.

In the accompanying drawings:—

Figure 1 is a cross section of a concrete pipe showing my improved tool positioned thereon. Figure 2 is a fragmentary longitudinal section of two concrete pipes showing a front view of the tool in place on the joint. Figure 3 is an enlarged transverse vertical section on line 3—3, Figure 1. Figure 4 is an enlarged longitudinal section of the tool taken on line 4—4, Figure 2. Figure 5 is a horizontal section taken in the plane of line 5—5, Figure 4. Figure 6 is an enlarged cross-section of a joint sealed by my tool and showing the track thereon.

Similar characters of reference indicate corresponding parts throughout the several views.

By way of example, my improved tool has been shown in connection with a flanged joint connecting a pair of adjoining concrete pipe-sections 10, 10, the opposing ends of the sections terminating in outwardly-facing coupling flanges 11, 11 disposed in the plane of the joint edges of the pipe-sections and having a split coupling ring 12 applied to the marginal portions of the coupling flanges for sealing the same to form a leak-proof joint. The coupling flanges and their sealing ring may be made of copper or other suitable malleable material, so that when the latter is pinched by external pressure applied to opposite sides of this ring, a practically integrally united structure and fluid-tight joint is produced. This improved machine is designed to furnish the desired pressure to so seal the coupling ring to the coupling flanges of the pipes.

Encircling the coupling ring 12 and embracing the top and adjoining sides thereof is a compressing or sealing member 13, preferably in the form of a split ring of nickle steel or similar material, provided at its opposing ends with outstanding ears 14 for receiving a clamping bolt 15 which firmly secures said member to the coupling ring of the joint. This sealing member in addition to holding the clamping ring tightly in place while being sealed also serves as a track on which the seaming tool is guided while traveling around the joint to seal it. As shown in Figure 3, the opposing contiguous faces of the coupling ring and track member 12, 13 are preferably flat sided to prevent the latter from slipping laterally on the former.

The seaming tool consists of a suitable casing in which its parts are mounted, the preferred casing shown in the drawings, consisting of a base section 16, a top section 17, and a cover 18, these parts being bolted or otherwise fastened to one another. Journaled at their lower ends in bearings 19, 20 applied to the base section 16 and at their upper ends in the cover 17 are companion upright shafts 21, 22 which are provided at their lower ends with forming or pressure rollers 23, preferably corrugated as shown, and arranged to engage opposite sides of the coupling ring 12 for propelling the tool in a circular path about the joint and also for compressing the sides of said coupling ring into sealing engagement with the joint-flanges 11. Motion may be transmitted to these forming rollers by any suitable means. As shown in the drawings, they may consist of reduction gearing 24 housed within the top-section 17 of the casing, thrust washers 25 being applied to the shafts 21, 22 between the lower set of gears and the bottom wall 26 of said top-section. Applied to the upper end of the shaft 21 is a worm wheel 27 geared to a worm 28 journaled at its ends in bearings 29 applied to the cover 18 and driven by a flexible shaft 30 from an electric motor or other available source of power.

Contained within the upright portion of a T-slot or opening 31 formed in the casing-section 16 and in a vertical plane between the forming roller-shafts 21, 22 is a guiding or sustaining roller 31ª for the tool, the same being adapted to travel over the flat surface of the track 13. Thrust rollers 32 bearing against the top sides of the roller on opposite sides of its center serve to maintain the track-engaging roller in firm engagement with the track. These thrust rollers are preferably adustable toward and from the center of the track roller to adapt the machine for use on pipes of varying diameters, and for this purpose each is mounted in a forked bearing 33 guided in grooves 34 formed in the side walls of the upper or transverse portion of the T-shaped opening 31, these bearings being urged toward the track roller to bring the companion thrust rollers into engagement therewith by adjusting screws or bolts 35 mounted in plugs 36 fitted in the ends of said opening, as shown in Figures 4 and 5. Engaging the lower portion of the roller on opposite sides of its center are followers 37 which act to prevent the roller shifting downwardly out of its casing, coil springs 38 applied to these followers offering the required resistance to prevent such displacement of the rollers. The periphery of the sustaining roller 31ª is flat and it offers a sufficient contact surface with the track 13 to prevent the machine from tipping laterally to one side or the other while the machine is revolving about the joint being seamed or sealed. If desired, guide rollers 39 may be journaled in brackets 40 provided at the front and rear end of the machine for assisting in stabilizing it with reference to the joint.

In order to permit of readily applying or removing the tool to and from the joint being operated upon, one of the forming rollers 23 and its shaft is shiftable in the casing in a direction toward and from the plane of rotation of the track roller 31. To this end, the lower bearing 20 of the shaft 22 is of two sections, which are divided at a point diametrically of the shaft and lengthwise of the tool, the bearing section 41 being carried by an adjusting block 42 guided for movement toward and from said shaft in an opening 43 formed in the base section 16 of the casing. Normally the adjusting head and its semi-circular bearing section 41 is held in cooperative relation with the companion bearing section 20 by one or more clamping bolts 44. The upper end of the shaft 22 is likewise mounted to permit such adjustment, and as shown, it extends through an opening 45 in the cover 18 and is held in its set position by a bearing block 46 and clamping bolt 47. Upon loosening the bolts 44, 47, the shaft 22 together with its forming roller 23 may be shifted outwardly to bring the latter clear of the coupling ring 11 of the joint and thereby permit the machine to be applied to or removed from the coupling ring in an obvious manner. The forming roller of the shaft 22 is set in its operative position relative to the companion roller to seam the joint by tightening up on the clamping bolts and shifting the bearing blocks 42, 46 toward the fixed bearing section 19.

As shown clearly in Figure 3, the forming or seaming rollers 23 are substantially frusto-conical in shape, their corrugated bearing faces converging upwardly to grip the lower portion of coupling ring 12 of the pipe joint and thus prevent outward displacement of the tool when revolving about the joint to seal it.

This improved seaming tool is simple, compact and durable in construction; it can be quickly applied to and removed from the pipe joint; and it permits of positively sealing the joints in a short period of time and with a minimum expenditure of power.

While the tool has been shown in connection with an external type of joint, it is equally applicable for use with joints of the internal type. It will be further understood, that the embodiment of the invention disclosed herein is illustrative only and that the invention may be incorporated in other forms and various changes in the construction thereof may be made within the spirit and scope of the appended claims.

I claim as my invention:—

1. A pipe-joint seaming tool, comprising a casing movable along and in the plane of the joint, means for guiding the casing along the joint and for preventing its movement out of the plane of the joint, seaming elements mounted on the casing for engagement with the pipe-joint to seal it, and means for transmitting motion to said seaming elements to propel the tool along the joint.

2. A pipe-joint seaming tool, comprising a casing, a roller disposed substantially centrally of the casing for guiding the tool in a circular path about the joint, seaming elements rotatably mounted on said casing below said guide roller for engagement with opposite sides of the pipe-joint to seal it, and means for transmitting motion to said seaming elements to propel the tool about the joint.

3. A pipe-joint seaming tool, comprising a casing, a roller disposed substantially centrally of the casing for guiding the tool in a circular path about the joint, thrust members mounted in said casing for engagement with the upper peripheral surface of said guide roller, seaming elements rotatably mounted on said casing below the guide roller for engagement with opposite sides of the pipe-joint to seal it, and means for transmitting motion to said seaming elements to propel the tool about the joint.

4. A pipe-joint seaming tool, comprising a casing, a roller disposed substantially centrally of the casing for guiding the tool in a circular path about the joint, thrust members mounted in said casing for engagement with the upper peripheral surface of said guide roller, means for adjusting said thrust members toward and from said guide roller, seaming elements rotatably mounted on said casing below the guide roller for engagement with opposite sides of the pipe-joint to seal it, and means for transmitting motion to said seaming elements to propel the tool about the joint.

5. A pipe-joint seaming tool, comprising a casing, a roller disposed substantially centrally of the casing for guiding the tool in a circular path about the joint, thrust members mounted in said casing for engagement with the upper peripheral surface of said guide roller, means engageable with the lower peripheral surface of the guide roller for holding the same in position in the casing, seaming elements rotatably mounted on said casing below said guide roller for engagement wtih opposite sides of the pipe-joint to seal it, and means for transmitting motion to said seaming elements to propel the tool about the joint.

6. A pipe-joint seaming tool, comprising a casing, having an upright opening disposed substantially centrally thereof, a roller fitted freely in said opening for guiding the tool in a circular path about the joint, means contained within said casing and engageable with the top and bottom peripheral faces of the guide roller to hold it in place within its opening, seaming elements rotatably mounted on said casing below said guide roller for engagement with opposite sides of the pipe-joint to seal it, and means for transmitting motion to said seaming elements to propel the tool about the joint.

7. A pipe-joint seaming tool, comprising a casing having a substantially T-shaped opening disposed vertically and lengthwise thereof, a roller sustained in a freely-revolving position in the upright portion of said opening for guiding the tool in a circular path about the joint, thrust rollers mounted in opposing relation in the horizontal portion of said opening and bearing against the upper peripheral face of said guide roller, seaming elements rotatably mounted on said casing below the guide roller for engagement with opposite sides of the pipe-joint to seal it, and means for transmitting motion to said seaming elements to propel the tool about the joint.

8. A pipe-joint seaming tool, comprising a traveling casing including means for guiding it along the joint, a pair of upright shafts journaled side by side in said casing, one of said shafts being shiftable toward and from the other, forming rollers fixed on the lower ends of the shafts for engagement with opposite sides of the joint to seal it, means for controlling the relative movements of said shiftable shaft for effecting the application and removal of the tool to and from the joint, and means for transmitting motion to said seaming elements to propel the tool along the joint.

9. In a jointing device of the character described, a track adapted for detachable application to the joint elements in overlying relation thereto, and a seaming tool guided on the track for movement thereon and having seaming elements engageable with the joint.

10. In a jointing device for flanged joints having a coupling ring therefor, a track adapted for application to the coupling ring, a seaming tool guided on the track for movement thereon, and seaming rollers carried by the tool and engageable with the coupling ring to seal it to the joint flanges.

11. In a jointing device for flanged joints having a coupling ring therefor, a track adapted for application to the coupling ring, a seaming tool guided on the track for movement thereon, seaming rollers carried by the tool and engageable with opposite sides of the coupling ring to seal it to the joint flanges, and means for transmitting motion to said rollers to propel the tool over the joint.

12. In a jointing device for flanged joints having a coupling ring therefor, a track adapted for application to the coupling ring, a seaming tool guided on the track for movement thereon, seaming rollers of frusto-conical shape carried by said tool and adapted for engagement with the opposite sides of the coupling ring of the joint to compress it about the flanges thereof, the peripheral faces of said rollers converging inwardly to prevent displacement of the tool relative to the joint, and means for transmitting motion to said rollers to propel the tool about the joint.

13. The combination of a track adapted for application to a flanged joint, and a seaming tool having means for guiding it on the track and for compressing the flanges of the joint into sealing engagement.

14. The combination of a track adapted for detachable application to the outer edge of a flanged joint, a seaming tool having a guide member for engaging the surface of said track, and seaming elements mounted on the tool in opposing relation to each other for engagement with the outer sides of the joint-flanges beneath the track to compress the flanges into sealing engagement.

15. A tool for seaming flanged joints, comprising a traveling casing, means for guiding said casing along the joint and for maintaining it against lateral displacement, and seaming elements mounted on the casing for engagement with the joint to seal it, said elements being arranged to grip the opposite sides of the joint to prevent vertical displacement of the casing relative thereto.

ALBERT G. PERKINS.